(12) United States Patent
Feick et al.

(10) Patent No.: US 12,679,458 B2
(45) Date of Patent: Jul. 14, 2026

(54) SYSTEM AND METHOD FOR ACTUATING AN ELECTROMECHANICAL STEERING SYSTEM OF A VEHICLE

(71) Applicant: Continental Autonomous Mobility Germany GmbH, Ingolstadt (DE)

(72) Inventors: Stefan Feick, Oberhausen (DE); Philipp Keßler, Nierstein (DE)

(73) Assignee: AUMOVIO Autonomous Mobility Germany GmbH, Ingolstadt (DE)

( * ) Notice: Subject to any disclaimer, the term of this patent is extended or adjusted under 35 U.S.C. 154(b) by 0 days.

(21) Appl. No.: 18/551,878

(22) PCT Filed: Mar. 9, 2022

(86) PCT No.: PCT/DE2022/200037
§ 371 (c)(1),
(2) Date: Sep. 22, 2023

(87) PCT Pub. No.: WO2022/199761
PCT Pub. Date: Sep. 29, 2022

(65) Prior Publication Data
US 2024/0174292 A1 May 30, 2024

(30) Foreign Application Priority Data
Mar. 22, 2021 (DE) ..................... 10 2021 202 740.7

(51) Int. Cl.
B62D 15/02 (2006.01)
B60W 30/10 (2006.01)
B60W 30/12 (2020.01)

(52) U.S. Cl.
CPC ........... B62D 15/025 (2013.01); B60W 30/10 (2013.01); B60W 30/12 (2013.01); B62D 15/0255 (2013.01); B62D 15/0265 (2013.01)

(58) Field of Classification Search
CPC .............. B62D 15/025; B62D 15/0255; B62D 15/0265; B60W 30/10; B60W 30/12
(Continued)

(56) References Cited

U.S. PATENT DOCUMENTS

| | | | | |
|---|---|---|---|---|
| 5,765,116 A | * | 6/1998 | Wilson-Jones | ...... G05D 1/0246 340/439 |
| 6,895,318 B1 | * | 5/2005 | Barton | .................. B60T 8/1755 701/41 |

(Continued)

FOREIGN PATENT DOCUMENTS

| | | |
|---|---|---|
| DE | 102007011275 A1 | 9/2008 |
| DE | 102014208786 A1 | 11/2015 |

(Continued)

OTHER PUBLICATIONS

Notice of Reasons for Refusal drafted Jun. 21, 2024 for the counterpart Japanese Patent Application No. 2023-552538 and machine translation of same.

(Continued)

*Primary Examiner* — Lindsay M Low
*Assistant Examiner* — Brian R Kirby

(57) ABSTRACT

A system for actuating an electromechanical steering system of a vehicle includes a driver assistance system, which generates a first item of steering control information, and a control unit having a first interface which receives driver torque information, and at least one second interface which receives at least one item of adjustment information which is dependent on the driving state and/or the driving situation. The control unit provides a second item of steering control information which is dependent on the driver torque information and the at least one item of adjustment information, and the system provides a modified item of steering control information to the steering system of the vehicle based on the first and the second item of steering control information, (Continued)

a steering movement being executed on the electromechanical steering system based on the modified item of steering control information.

14 Claims, 2 Drawing Sheets

(58) Field of Classification Search
USPC .......................................................... 701/41
See application file for complete search history.

(56) References Cited

U.S. PATENT DOCUMENTS

| | | | | | |
|---|---|---|---|---|---|
| 6,900,609 | B2 * | 5/2005 | Kunzel | ............... | H02P 29/0016 |
| | | | | | 318/609 |
| 2002/0169531 | A1 * | 11/2002 | Kawazoe | ............. | B62D 5/0463 |
| | | | | | 180/443 |
| 2005/0125153 | A1 * | 6/2005 | Matsumoto | ......... | B60T 8/17557 |
| | | | | | 701/41 |
| 2008/0006469 | A1 * | 1/2008 | Sasaki | .................. | B62D 5/0481 |
| | | | | | 180/428 |
| 2008/0091320 | A1 * | 4/2008 | Sakai | ..................... | B62D 1/286 |
| | | | | | 701/42 |
| 2010/0010712 | A1 * | 1/2010 | Rubia | .................. | B62D 15/025 |
| | | | | | 701/42 |
| 2010/0235051 | A1 * | 9/2010 | Kariatsumari | .......... | H02P 21/16 |
| | | | | | 318/400.15 |
| 2012/0101687 | A1 * | 4/2012 | Svensson | ............. | B62D 15/025 |
| | | | | | 701/42 |
| 2012/0191301 | A1 * | 7/2012 | Benyo | .................. | B62D 5/0463 |
| | | | | | 701/41 |
| 2014/0257628 | A1 * | 9/2014 | Lee | ..................... | B62D 15/025 |
| | | | | | 701/34.4 |
| 2016/0200348 | A1 | 7/2016 | Luke | | |
| 2021/0009194 | A1 | 1/2021 | Kim | | |
| 2022/0001890 | A1 * | 1/2022 | Babar | .................. | B62D 15/025 |
| 2022/0371657 | A1 * | 11/2022 | Gonschorek | ......... | B62D 15/025 |
| 2024/0182109 | A1 * | 6/2024 | Goetz | .................. | B62D 5/0463 |

FOREIGN PATENT DOCUMENTS

| | | | | |
|---|---|---|---|---|
| DE | 102015214428 A1 | 2/2017 | | |
| DE | 102016215724 A1 | 2/2018 | | |
| DE | 102016218845 A1 | 3/2018 | | |
| JP | 2016120863 A | 7/2016 | | |
| JP | 2018052271 A | 4/2018 | | |
| JP | 2018176959 A | 11/2018 | | |
| JP | 2019166949 A | 10/2019 | | |
| JP | 2020114710 A | 7/2020 | | |
| WO | WO-2017046114 A1 * | 3/2017 | ......... | B60T 8/17557 |
| WO | 2017168738 A1 | 10/2017 | | |

OTHER PUBLICATIONS

Notice of Reasons for Refusal drafted Dec. 12, 2024 for the counterpart Japanese Patent Application No. 2023-552538 and translation of same.
German Search Report dated Oct. 7, 2021 for the counterpart German Patent Application No. 10 2021 202 740.7.
The International Search Report and the Written Opinion of the International Searching Authority mailed on Jun. 30, 2022 for the counterpart PCT Application No. PCT/DE2022/200037.
Chinese Office Action dated Nov. 28, 2025 for the counterpart Chinese Patent Application No. 202280021009.3 and machine translation of same.
Decision to Grant a Patent mailed on Jun. 4, 2025 for the counterpart Japanese Patent Application No. 2023 552538 and machine translation of same.
Chinese Office Action dated Mar. 23, 2026 for the counterpart Chinese Patent Application No. 202280021009.3 and machine translation of same.

* cited by examiner

1

SYSTEM AND METHOD FOR ACTUATING AN ELECTROMECHANICAL STEERING SYSTEM OF A VEHICLE

CROSS-REFERENCE TO RELATED APPLICATIONS

The present application is a National Stage Application under 35 U.S.C. § 371 of International Patent Application No. PCT/DE2022/200037 filed on Mar. 9, 2022, and claims priority from German Patent Application No. 10 2021 202 740.7 filed on Mar. 22, 2021, in the German Patent and Trademark Office, the disclosures of which are herein incorporated by reference in their entireties.

TECHNICAL FIELD

The invention relates to a system as well as a method for actuating an electromechanical steering system of a vehicle.

BACKGROUND

Electromechanical steering systems for vehicles (also EPS: Electric Power Steering) are in principle known. In this case, a program-controlled electric actuator supports and superposes the steering movements of the driver by transferring the forces to the steering mechanics.

Lane-guided driver assistance systems utilize captured environmental information in order to control the vehicle laterally and longitudinally along a planned trajectory. In most cases, the electromechanical steering, which obtains suitable actuating information from a trajectory tracking controller, is used as the actuator for lateral vehicle guidance.

On the one hand, systems having a first interface variant are known, in which the vehicle lateral dynamics are influenced by an additive superposition of torque values with the motor torque of the control motor of the electromechanical steering. On the other hand, systems having a second interface variant are known, in which the vehicle lateral dynamics are controlled by specifying a nominal steering angle. In this case, a steering angle controller is implemented on the control unit of the electromechanical steering.

In the case of driver assistance systems, the main design objective is to achieve high control quality during lane guidance. Here, the fact that a high degree of steering comfort is simultaneously striven for when the driver oversteers frequently leads to a trade-off. In this case, the term "oversteering" is understood to mean that the driver executes a steering movement on the steering device, which deviates from the steering movement specified by the driver assistance system.

Irrespective of the interface variant, the disadvantage of known implementations is that the level, course and direction of the steering torque when the driver oversteers are only partially comprehensible or perceived as unnatural since these are undifferentiated in terms of their effect, because they are not adjusted to the respective driving situation and are always directed counter to the driver's movement of the steering wheel.

In the case of known implementations, for example during oversteering even with small steering wheel deflections, the torque which the driver has to apply to the steering device, hereinafter also referred to as the driver torque, can increase continuously up to a value which corresponds to the level of the safety barrier which, due to the limitation of the motor torque of the actuator of the electromechanical steering, exists to ensure oversteerability by the driver. The increase in the driver torque is due to the fact that the driver's actions are interpreted, in control engineering terms, as a disturbance torque acting directly on the angle control loop and, moreover, due to the resulting change in vehicle alignment as a disturbance variable for the trajectory tracking control loop. The disturbance by the driver is then eliminated by control with the dynamics of the overall disturbance transfer function of the lateral control. The higher the dynamics of the overall disturbance transfer function are, the more quickly the counter-torque for the driver increases. In addition, the counter-torque for the driver increases all the higher in absolute terms, the higher the steady component gain of the overall disturbance transfer function is.

The disadvantage of the effects described above is that, in extreme cases, for example during emergency steering maneuvers, the driver assistance system works against the driver without taking into account the driving situation and impedes the latter in that the driver has to apply an additional steering torque in order to overrule the specification of the driver assistance system which is currently pursuing another guidance objective.

In general, during cooperative driving, i.e., when the driver is interacting with the driver assistance system, the effects described above lead to reduced driving comfort and, therefore, to less acceptance of the driver assistance function.

SUMMARY

Proceeding herefrom, it is an object of the present disclosure to indicate a system for actuating an electromechanical steering system of a vehicle, which makes possible cooperative driving behavior which is comprehensible and more natural for the driver, without adversely affecting the performance of the driving function significantly.

The object is addressed by a system having the features of the independent Claim 1. Example embodiments are the subject-matter of the subclaims. A method for actuating an electromechanical steering system of a vehicle is the subject-matter of the alternative, independent Claim 14.

According to a first aspect, the present disclosure relates to a system for actuating an electromechanical steering system of a vehicle. The vehicle includes a driver assistance system which is designed to generate a first item of steering control information. In addition, the system has a control unit with at least one first controller unit. The control unit includes a first interface which is designed to receive driver torque information. In addition, the control unit includes at least one second interface which is designed to receive at least one item of adjustment information which is dependent on the driving state and/or the driving situation. A first and a second item of adjustment information are provided via the second interface. At least one item of the adjustment information is dependent on the driving state or driving situation. The control unit is designed to provide a second item of steering control information which is dependent on the driver torque information and the at least one item of adjustment information. The system is furthermore designed to provide a modified item of steering control information to the steering system of the vehicle based on the first and the second item of steering control information, a steering movement being executed on the electromechanical steering system based on said modified item of steering control information. The expression "executing a steering movement based on the modified item of steering control information" means that either the modified item of steering control information itself or a variable derived therefrom, which is formed, for example, by the transfer function of a safety barrier, is used for initiating steering movements on the electromechanical steering system.

The technical advantage of the system according to the present disclosure is that the driver torque which the driver feels on the steering device during cooperative driving can be set depending on the driving state or the driving situation, so that the result is a driving behavior which feels natural to the driver. It is only made more difficult to oversteer the specification of the driver assistance system in extreme cases, for example during emergency steering maneuvers, such that the driver is given a signal that it is better, due to the driving situation, to comply with the specification of the driver assistance system.

According to one example embodiment, the first item of steering control information is an item of angle information, an item of torque information for the actuator of the electromechanical steering system or an item of information proportional to the torque of the actuator of the electromechanical steering system. The driver assistance system therefore controls the electromechanical steering either based on an item of nominal steering angle information or a nominal torque specification, and the item of nominal steering angle information or nominal torque specification is converted into the modified item of steering control information depending on the driver's influence through the second item of steering control information. As a result, the system can be deployed both in the case of an interface variant having an angle interface and in the case of an interface variant having a torque interface.

According to one example embodiment, a first item of adjustment information is a driver torque threshold value. The control unit is designed, when an amount of the driver torque information is above the driver torque threshold value, to generate a second item of steering control information which brings about a modification of the first item of steering control information provided by the driver assistance system. Therefore, the specification of the driver assistance system is only modified by the oversteering driver when the driver torque threshold value has been exceeded. As a result, the driver's unintentional, weak steering movements, for example, do not influence the specification of the driver assistance system.

According to one example embodiment, a second item of adjustment information is an item of oversteering stiffness information which is a measure of the steering resistance which the driver has to overcome on the steering device in order to oversteer the steering behavior specified by the driver assistance system. The oversteering stiffness information forms, for example, an item of information similar to a variable spring constant of a spring, via which a force which has to be overcome in order to compress the spring can be set. The oversteering stiffness information indicates the difficulty with which the steering behavior which is specified by the driver assistance system can be influenced by the driver. By amending the oversteering stiffness information, it is therefore possible to set, depending on the situation, what the driver's torque has to be on the steering device in order to bring about a specified steering movement of the electromechanical steering system.

According to one example embodiment, the control unit is designed to adjust the control behavior of the first controller unit of the control unit based on the oversteering stiffness information. At least one gain factor of the first controller unit is adjusted as a function of the oversteering stiffness information. A function can be provided which maps the required degree of oversteering stiffness on the at least one gain factor. A reciprocal dependency exists such that a higher oversteering stiffness is converted to a lower control loop gain and vice versa. It can additionally be advantageous for at least one limit frequency of the first controller unit to be adjusted in order to meet stability criteria. The limit frequency can be adjusted, for example, depending on the oversteering stiffness information. Here as well, a function can be provided which maps the required degree of oversteering stiffness on the at least one limit frequency.

According to one example embodiment, the control unit is designed to receive a first and a second item of adjustment information, wherein either one of the two items of adjustment information has a fixed value and the other item of adjustment information has a value which is dependent on the driving state or driving situation, or the first and second items of adjustment information are both dependent on the driving state or the driving situation. As a result, the steering behavior of the driver assistance function can be structured depending on the driving state and the driving situation such that cooperative driving behavior which is as natural as possible is achieved.

According to one example embodiment, the control unit is designed such that the first controller unit receives a torque difference which is zero when the amount of the driver torque information is less than or equal to the driver torque threshold value, and has an amount of driver torque information reduced by the driver torque threshold value as soon as the amount of the driver torque information exceeds the driver torque threshold value. As a result, it can be achieved that the specification of the steering assistance system is only influenced by the driver when he applies a significant torque to the steering device.

According to one example embodiment, the first controller unit has a monotonically decreasing amount characteristic above a limit frequency. Such control behavior is advantageous for cooperative driving behavior since vibrations in the steering wheel, for example as a consequence of the control loop created by the negative feedback of the driver torque, can be effectively avoided.

According to one example embodiment, the first controller unit has control behavior in accordance with a PT1 controller. This type of controller is advantageously suited to controlling the vehicle interactively through influences by the driver and the driver assistance system.

According to one example embodiment, the first controller unit has control behavior such that, as a result of the modification of the first item of steering control information by the second item of steering control information, the torque difference supplied to the first controller unit as an input variable is reduced.

Therefore, control behavior of the system is achieved such that the driver assistance function is increasingly adjusted to the driver's steering specifications and, thus, the driver assistance system directs less counter-torque to the driver.

According to one example embodiment, in the event that the first item of steering control information is an item of angle information, an item of yaw rate information or an item of curvature information, a second controller unit is provided which is designed to convert an item of nominal torque information of the steering angle controller for the actuator of the electromechanical steering system or an item of information proportional to the nominal torque information into an item of steering angle information, an item of yaw rate information or an item of curvature information as the second item of steering control information. This makes it possible to convert the output information influenced by the driver torque information by means of the second controller unit such that the second item of steering control information provided by the system can be used to directly modify the first item of steering control information, for example by an arithmetical operation of a sum or difference formation.

According to one example embodiment, the second controller unit is designed to receive an item of nominal torque information of the steering angle controller, which is weighted with an activation factor, for the actuator of the electromechanical steering system, wherein the activation factor is provided by the first controller unit. An item of torque information is received by the control loop of the second controller unit and an arithmetical operation is performed with a nominal value. The torque information is provided, for example, by the steering angle controller of the electromechanical steering system. For example, the torque information is subtracted from the nominal value and the control difference formed as a result is multiplied by the activation factor. The result of the multiplication is subsequently supplied to the second controller unit as input information. In the case of the driver oversteering, the level of the torque of the actuator is mainly a measure of the torque which the driver meets with. As a result of the second controller unit now attempting to reduce the control difference multiplied by the activation factor, the working of the driver assistance function against the driver is effectively reduced. In this case, the extent of this reduction is specified via the level of the activation factor.

According to one example embodiment, the second controller unit is designed to receive the oversteering stiffness information and to adjust the control behavior of the second controller unit based on the oversteering stiffness information. At least one gain factor of the second controller unit is adjusted as a function of the oversteering stiffness information. A function can be provided which maps the required degree of oversteering stiffness on the at least one gain factor. A reciprocal dependency exists such that a higher oversteering stiffness is converted to a lower control loop gain and vice versa. It can additionally be advantageous for at least one limit frequency of the second controller unit to be adjusted in order to meet stability criteria. The limit frequency can be adjusted, for example, depending on the oversteering stiffness information. Here as well, a function can be provided which maps the required degree of oversteering stiffness on the at least one limit frequency.

According to one example embodiment, the second controller unit has a monotonically decreasing amount characteristic above a limit frequency and/or has control behavior in accordance with a PT1 controller. Such control behavior or this type of controller is advantageously suited to controlling the vehicle interactively through influences of the driver and of the driver assistance system.

According to a further aspect, the present disclosure relates to a method for actuating an electromechanical steering system of a vehicle, including a driver assistance system, which provides a first item of steering control information, and a control unit with at least one first controller unit, wherein the control unit receives driver torque information which the human driver applies to the steering device, and receives at least one item of adjustment information which is dependent on the driving state and/or the driving situation, wherein the control unit provides a second item of steering control information which is dependent on the driver torque information and the at least one item of adjustment information, and the system provides a modified item of steering control information to the steering system of the vehicle based on the first and the second item of steering control information, a steering movement being executed on the electromechanical steering system based on the modified item of steering control information.

Within the meaning of the present disclosure, the expressions "approximately," "substantially" or "roughly" mean deviations from the exact value in each case by +/−10%, such as by +/−5% and/or deviations in the form of alterations which are insignificant to the function.

DESCRIPTION OF THE DRAWINGS

Further developments, advantages and possible applications of the present disclosure are set out by the following description of example embodiments and by the figures. All of the features described and/or pictured per se or in any combination are fundamentally the subject-matter of the present disclosure, independently of their combination in the claims or references back thereto. The content of the claims is also made an integral part of the description.

The invention is explained in greater detail below on the basis of the figures with reference to example embodiments, wherein.

DETAILED DESCRIPTION

Figure 1:
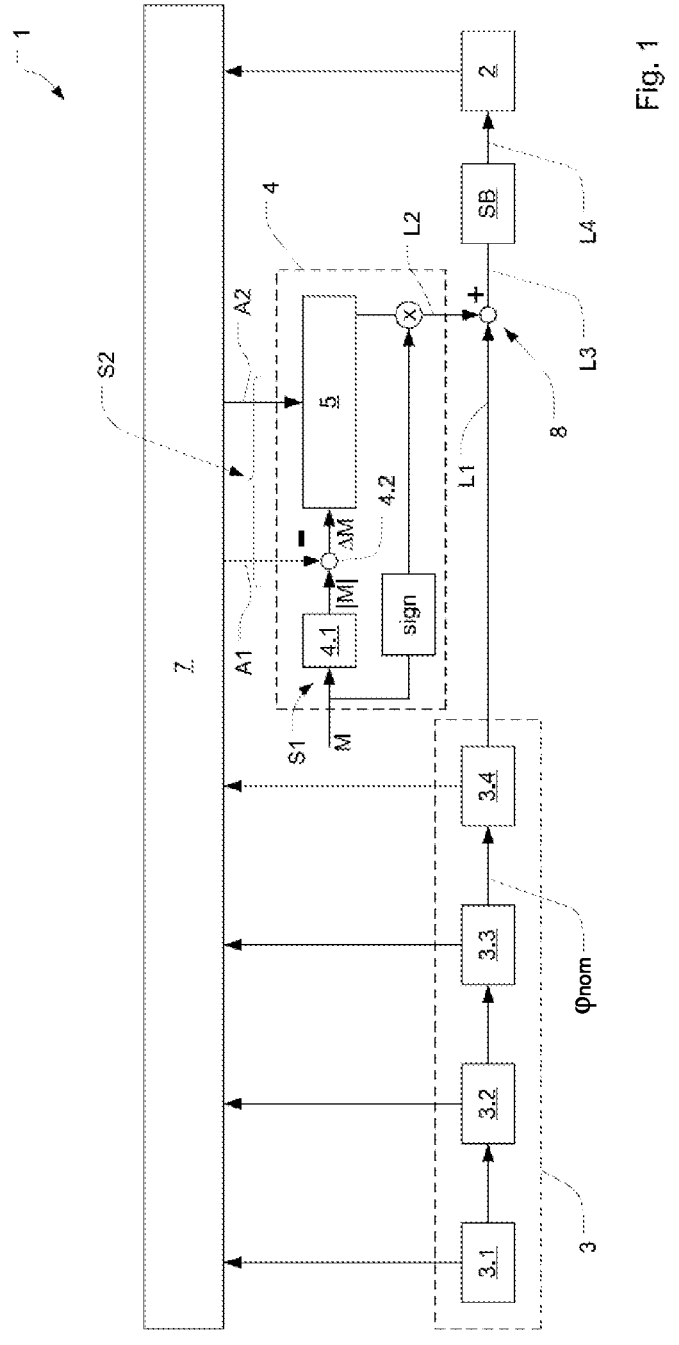
FIG. 1 shows, by way of example, a schematic representation of a first embodiment of a system for actuating the electromechanical steering of a vehicle, wherein the electromechanical steering is actuated by the driver assistance system by means of an item of torque information.

FIG. 1 shows, by way of example and schematically, a block diagram of a first example embodiment of a system 1 which is used for actuating a steering system 2 having an electromechanical drive (EPS: electric power steering). In the case of such a steering system 2, a program-controlled electric actuator supports the steering movements of the driver or carries out its own steering movements at least partially during autonomous or partially autonomous driving.

The steering system 2 according to the first example embodiment has a torque interface, i.e., the steering system 2 is designed to obtain, as input information, an item of torque information for the actuator of the steering system 2 or an item of information proportional to the torque, for example an item of information regarding the current through the actuator of the steering system 2.

The system 1 has a driver assistance system 3 which provides a first item of steering control information L1 at an output interface. The driver assistance system can, for example, have an environment recognition unit 3.1 which creates an environment model in the vehicle area by means of sensor technology. Moreover, the driver assistance system 3 can have a trajectory planner unit 3.2. The trajectory planner unit 3.2 is coupled at least indirectly to the environment recognition unit 3.1 and is designed to receive information from the environment recognition unit 3.1 and, based thereon, to plan driving trajectories.

In addition, the driver assistance system 3 has trajectory tracking control 3.3. The latter is coupled at least indirectly to the trajectory planner unit 3.2 and is designed to calculate control information for the vehicle in order to move the vehicle on a calculated and selected driving trajectory. The output information of the trajectory tracking control 3.3 is a nominal steering angle $j_{nom}$ which serves to drive along a selected driving trajectory.

In addition, the driver assistance system 3 has a steering angle controller 3.4. The steering angle controller 3.4 is coupled at least indirectly to the trajectory tracking control 3.3 and receives control information from the trajectory tracking control 3.3, in particular the nominal steering angle. The steering angle controller 3.4 is designed to provide, as a nominal value specification, an item of torque information for the actuator of the steering system 2 or an item of information proportional to the torque, for example an item of information regarding the current through the actuator of the steering system 2. In addition, the steering angle controller 3.4 can be designed to suppress disturbing effects such as, for example, oscillating steering behavior. The steering angle controller 3.4 provides the first item of steering control information L1.

At least some of the aforementioned units 3.1 to 3.4 of the driver assistance system 3 can, as indicated by the vertical arrows in FIG. 1, be connected to a unit 7, by means of which a driving state recognition or driving situation recognition is provided. The unit 7 can, for example, be a functional component of the driver assistance system 3, i.e., it can be provided in a control unit of the driver assistance system 3 or in a control unit which is separate from the driver assistance system 3. The unit 7 can, in addition, have means for observing the driver in order to capture and to process the driver's behavior, the direction in which he is looking and/or his actions in order to be able to draw conclusions therefrom about the driver's future driving commands.

In addition, the system 1 has a control unit 4 which is designed to provide a second item of steering control information L2. The system 1 modifies the first item of steering control information L1 by means of the second item of steering control information L2 such that improved cooperative driving, in which the human driver is given greater freedom to participate in the control of the vehicle depending on the driving state and/or the driving situation, even when the driving assistance function is activated, which brings about a lateral control of the vehicle, by means of the third, modified item of steering control information L3 resulting from the modification, so that the impression of heteronomous driving behavior is reduced depending on the driving state and/or the driving situation.

The control unit 4 has a first interface S1 which is designed to receive driver torque information M. The driver torque information M is torque information or a variable which is proportional to this torque information, which indicates what torque the driver applies to the steering device of the vehicle.

The driver torque information M is initially subjected to a sum formation by means of a summing unit 4.1. An item of driver torque information |M| which is independent of the algebraic sign is therefore provided, independently of the driver's steering direction, at the output of the summing unit 4.1.

It should be noted that in the example embodiment shown, a reference-arrow system was chosen, in which a positive driver torque is defined such that it has the same effect as a positive motor torque of the electromechanical steering system 2 or as a positive steering angle which usually indicates cornering to the left.

In addition, the control unit 4 has a second interface S2, at which a first and a second item of adjustment information A1, A2 are provided. The first and a second item of adjustment information A1, A2 are provided by the unit 7. At least one of the items of adjustment information A1, A2 is a variable dependent on the driving state and/or driving situation, i.e., the first and/or second adjustment information A1, A2 is changed depending on the driving state or driving situation which the unit 7 recognizes. The first and second items of adjustment information A1, A2 are adjusted depending on the driving state and/or the driving situation.

The first item of adjustment information A1 is a driver torque threshold value, i.e., a threshold value for an item of torque information or a variable proportional to the item of torque information. The first item of adjustment information A1 is used in the control unit 4 in order to fix a threshold which, when this is exceeded, is intended to make it possible for the driver to influence the steering behavior specified by the driver assistance system 3. To this end, the driver torque information |M|, which is independent of the algebraic sign, provided by the summing unit 4.1 and the first item of adjustment information A1 are supplied to a subtraction point 4.2 which provides an item of torque difference information DM on the output side.

The torque difference information DM is supplied, as input information, to a first controller unit 5. The latter obtains, as further input information, the second item of adjustment information A2. The controller unit 5 has the effect of a limiting controller and, indeed, such that by adjusting the control behavior of the first controller unit 5 by means of the second item of adjustment information A2, the hardness can be set by means of which the steering behavior specified by the driver assistance system can be oversteered by the driver. In other words, the torque which the driver has to apply to the steering wheel, above which the driver assistance system becomes increasingly flexible with regard to a deviating direction desired by the driver, is specified by the first controller unit 5. The degree of this flexibility is defined by the adjustment information. In other words, the hardness of the steering resistance which the driver feels when oversteering the steering specification of the driver assistance system is therefore set to be variable. The second item of adjustment information A2 is thus also referred to below as "oversteering stiffness."

The control behavior of the first controller unit 5 is changed, based on the second item of adjustment information A2. In particular, the controller gain within the first controller unit 5 is influenced by the second item of adjustment information A2. One or more gain factors of the first controller unit 5 are influenced such that the desired oversteering stiffness is achieved.

There exists, for example, a reciprocal dependency between the second item of adjustment information A2 and the control loop gain in the first controller unit 5, i.e., a higher second item of adjustment information A2 or oversteering stiffness results in lower controller gains and vice versa. In other words, a required lower oversteering stiffness is mapped on a higher controller gain of the first controller unit 5 and vice versa. In the first extreme case, in the case of a maximum second item of adjustment information A2 or maximum oversteering stiffness, the control loop gain becomes zero, i.e., the control unit 4 is virtually inactive as a result and the oversteering stiffness is determined exclusively or virtually exclusively by the interference suppression property of the steering angle controller 3.4.

In the second extreme case of a minimal second item of adjustment information A2 or minimal oversteering stiffness, the controller gains assume high values. The level of these is only limited, for example, by the outlay invested in the design and implementation of stabilization measures.

If the oversteering stiffness is low, the assistance system is perceived by the driver during cooperative driving as being more flexible and less strongly recommending. Especially in the case of a specified, low oversteering stiffness, an adjustment of the limit frequencies of the first controller unit 5 may possibly be necessary due to the higher loop gain in order to comply with stability criteria. The filter limit frequency/frequencies of the first controller unit 5 is/are likewise adjusted based on the second item of adjustment information A2.

The control unit 4, in particular the first controller unit 5, has a saturation function. For example, the saturation function is chosen such that the maximum value of the output information of the first controller unit 5 or the maximum value of the second item of steering control information L2 is restricted.

The amount of the output information of the first controller unit 5 is therefore limited by the saturation function in specifiable thresholds. The definition of these thresholds represents a further degree of freedom for the design of the oversteering behavior. The thresholds can assume a defined, fixed value or can likewise be structured depending on the driving situation. Low thresholds allow the counter-torque for the driver to increase again as of a certain degree of oversteering. The reason for this is that at a comparatively low threshold, the amount of the first item of steering control information L1 exceeds the second item of steering control information L2 as of a certain degree of oversteering and, as a result, the modified item of steering control information L3 formed by the summation point 8 increasingly represents the wishes of the driver assistance system, which eliminates the driver by control as a disturbance of the control loop. As a result, the counter-torque for the driver increases again. One application is that the driver torque is initially relatively low when the desired deviation from the specification of the driver assistance system is small and only increases when the desired deviation is larger, as a result of which a tolerance zone for the oversteering is haptically transmitted to the driver.

High limiting thresholds for the second item of steering control information L2 mean that the first item of steering control information L1 can be overruled. The modified item of steering control information L3 therefore increasingly represents the driver's oversteering wish, and the control objective of the driver assistance system is pushed back further and further. Ultimately, the required steering torque for a steering maneuver can be smaller than is necessary without a driver assistance function. One application for this is, e.g., an emergency avoidance steering maneuver, the method does not only apply less counter-torque to the driver, but even supports the latter.

The output information provided by the first controller unit 5 is subsequently multiplied by the algebraic sign of the driver's torque, as represented in FIG. 1 by the "sign" block. The "sign" function establishes the algebraic sign of the driver torque information M, and the second item of steering control information L2 is formed by multiplying the output information of the first controller unit 5 by the algebraic sign of the driver torque information M. The result of this is that the control unit 4 provides an item of steering control information L2, independently of the steering direction, which is directed such that the driver's torque is reduced.

The second item of steering control information L2 is transferred to an addition point 8. There, the second item of steering control information L2 and the first item of steering control information L1 are added and the third item of steering control information L3 is provided. It is understood that in the case of an inverted reference-arrow system, the addition point 8 can be replaced by a subtraction point, which ultimately leads to a functionally identical system.

The third item of steering control information L3 is supplied to a safety barrier SB which provides a fourth item of steering control information L4 on the output side. The safety barrier SB is a unit which monitors or actively limits the manipulated variable before it is physically taken into account in terms of absolute height and gradient.

The safety barrier SB is configured, for example, to monitor the modified item of steering control information L3 in terms of its compliance with safety objectives and, if necessary, to modify it if the safety objectives are not being complied with. For example, the absolute height of the modified item of steering control information L3 and the gradient thereof can thus be monitored and, if necessary, also actively limited.

The fourth item of steering control information L4 forms the input variable of the electromechanical steering system 2. Depending on the driver torque information M and the first and the second item of adjustment information A1, A2, the first controller unit 5 generates a second item of steering control information L2 which changes the first item of steering control information L1 generated by the driver assistance system 3, so that an influence of the driver, which is dependent on the first and the second items of adjustment information A1, A2, is effected on the steering system 2 of the vehicle.

As indicated by the arrows running upward from the driver assistance system 3 and the steering system 2 to the unit 7, information from the functional units 3.1 to 3.4 of the driver assistance system 3 and the electromechanical steering system 2 can be used to capture the driving state or the driving situation.

Figure 2:
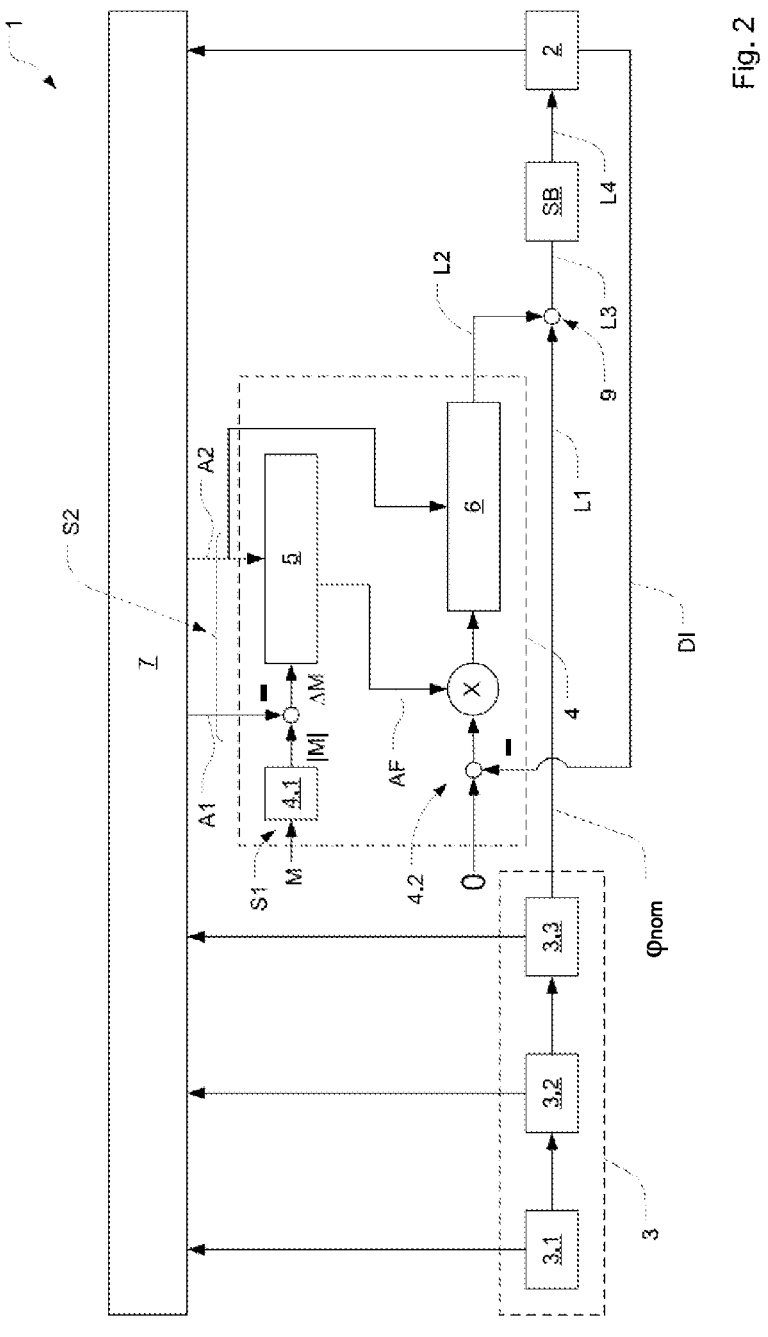
FIG. 2 shows, by way of example, a schematic representation of a second embodiment of a system for actuating the electromechanical steering of a vehicle, wherein the electromechanical steering is actuated by the driver assistance system by means of an item of nominal steering angle information.

FIG. 2 shows, by way of example and schematically, a block diagram of a second example embodiment of a system 1 which is used for actuating a steering system 2 having an electromechanical drive.

The steering system 2 according to the second example embodiment has an angle interface, i.e., the steering system 2 is designed to receive, as input information, an item of angle information, in particular an item of nominal steering angle information $j_{nom}$. The steering angle controller is integrated in the steering system 2. The driver assistance system 3 provides the nominal steering angle information $j_{nom}$ as the first item of steering control information L1 to an output interface.

The driver assistance system has, in turn, for example, an environment recognition unit 3.1 which creates an environment model in the vehicle area by means of sensor technology. Moreover, the driver assistance system 3 can have a trajectory planner unit 3.2. The trajectory planner unit 3.2 is coupled at least indirectly to the environment recognition unit 3.1 and is designed to receive information from the environment recognition unit 3.1 and to plan driving trajectories based thereon.

In addition, the driver assistance system 3 has trajectory tracking control 3.3. The latter is coupled at least indirectly to the trajectory planner unit 3.2 and designed to calculate control information for the vehicle, in order to move the vehicle on a calculated and selected driving trajectory. The output information of the trajectory tracking control 3.3 is, in the example embodiment shown, the first item of steering control information L1 in the form of the nominal steering angle information $j_{nom}$, according to which a selected driving trajectory is driven along.

At least some of the aforementioned units 3.1 to 3.3 of the driver assistance system 3 can, as indicated by the vertical arrows in FIG. 2, be connected to a unit 7, by means of which a driving state recognition or driving situation recognition is provided. The unit 7 can, for example, be a functional component of the driver assistance system 3, i.e., it can be provided in a control unit of the driver assistance system 3 or else in a control unit which is separate from the driver assistance system 3. The unit 7 can, in addition, have means for observing the driver in order to capture and process the behavior of the driver, the direction in which he is looking and/or his actions in order to be able to draw conclusions therefrom about the driver's future driving commands.

The system 1 has, in turn, a control unit 4 which is designed to provide a second item of steering control information L2. The system 1 modifies the first item of steering control information L1 by means of the second item of steering control information L2 such that improved cooperative driving, in which the human driver is given greater freedom to participate in the control of the vehicle depending on the driving state and/or the driving situation, even when the driving assistance function is activated, which brings about a lateral control of the vehicle, by means of the modified item of steering control information L3 resulting from the modification, so that the impression of heteronomous driving behavior is reduced depending on the driving state and/or the driving situation.

The interfaces S1 and S2 of the control unit 4 and the processing of the information received at the interfaces S1 and S2 by the summing unit 4.1 and the first controller unit 5 are identical to the first example embodiment according to FIG. 1, so that reference is made to the previous explanations. These also apply similarly to the example embodiment in FIG. 2.

One significant difference from the example embodiment according to FIG. 1 is that in the case of the example embodiment according to FIG. 2, the second item of steering control information L2 is not provided directly by the first controller unit 5, but the first controller unit 5 provides an activation factor AF.

The control unit 4 further has a subtraction point 4.2. On the one hand, a nominal value is supplied to the subtraction point 4.2, in the example embodiment the nominal value "0", as well as an item of torque information DI of the electromechanical steering system 2. The torque information DI corresponds, for example, to the required actuating torque of the steering angle controller of the electromechanical steering system 2 or a required current through the actuator, which is directly proportional thereto. To this end, the total torque derived from the resulting actual motor current can also be used following deduction of the torque or current requirements by the remaining functions on the control unit of the electromechanical steering system 2.

At the subtraction point 4.2, the torque information DI is deducted from the nominal value. The result of the difference is modified based on the activation factor AF. In particular, the output information of the subtraction point 4.2 is multiplied by the activation factor AF and the result of the multiplication of the second controller unit 6 is supplied as input information. The activation factor is a rational number in the range between 0 and 1 (AF $\in$ [0,1]). The activation factor is influenced by the driver torque information M and the first and second items of adjustment information A1, A2. A value of "0" leads to the driver perceiving hard steering, i.e., cooperative driving is strongly suppressed. A value of "1", on the other hand, means that the steering system 2 is allowing the driver to participate to a large extent and the steering requirements of the driver assistance system 3 are weighted less in comparison.

The second controller unit 6 receives the difference weighted with the activation factor AF. The second controller unit 6 is designed, for example, as a torque control loop. The second controller unit 6 is designed as a PT1 controller.

The second controller unit 6 is linked to the first controller unit 5, in an example embodiment, in that the first controller unit 5 generates an activation factor AF with a value between 0 and 1 at its output interface, with which the control difference of the second controller unit 6 is scaled. Without driver interaction, the first controller unit generates an activation factor of 0, as a result of which the torque information of the steering system 2, in particular of the steering angle controller of the steering system 2, is not fed back. When there is driver interaction, the first controller unit 5 generates an activation factor AF greater than 0 depending on the first and the second item of adjustment information, A1, A2. The contribution of the second item of adjustment information A2 (i.e., the oversteering stiffness) to the activation factor AF is such that a higher second item of adjustment information A2, i.e., a higher oversteering stiffness, brings about a smaller activation factor AF at the output interface of the first controller unit 5.

The contribution of the deviation of the driver torque information M from the first item of adjustment information A1 (i.e., the driver torque threshold) to the activation factor AF is structured such that the activation factor AF becomes all the greater the more the driver torque information M exceeds the first item of adjustment information A1, i.e., the activation factor AF becomes all the greater, the greater the driver torque residual becomes.

The contributions made by the adjustment information to achieving a desired result can be weighted and, in particular, subjected to a minimum operation.

In this case, weighting factors k1, k2 are used, which offer degrees of freedom in the construction of the first controller unit. The second item of adjustment information A2 assumes values in the range between 0 and 1.

With the assignment $$DM = \min(1, \max(0, (|M| - A1)))$$

wherein DM is the torque difference (as the input information of the first controller unit 5), |M| is the amount of the driver torque information and A1 is the first item of adjustment information (driver torque threshold value), and of the impulse response g(t) of the first controller unit 5, with which the torque difference DM is convolved (convolution operator *), the following is obtained for the adjustment factor AF:

$$AF(t) = \min(1, \max(0, (\min(k1 \cdot (DM(t) * g(t)), k2 \cdot (1 - A2(t)))))))$$

As shown in FIG. 2, the second item of adjustment information A2 can also be used to influence the control behavior of the second controller unit 6. For example, the second item of adjustment information A2 can be used to raise the controller gain of the second controller unit 6 when the second item of adjustment information A2 falls. Depending on the stability reserve, it can be advantageous to also adjust the parameters of the second controller unit 6 which determine the frequency response accordingly at the same time, for example in the form of a shift in poles and/or zeroes.

Even in the case of the example embodiment according to FIG. 2, the driver interaction can, as a function of the current driving situation, only be adjusted by the first item of adjustment information A1, only by the second item of adjustment information A2 or by a combination of both items of adjustment information A1, A2. If merely one of the two items of adjustment information A1, A2 is altered dynamically depending on the driving state or the driving situation, the other item of adjustment information in each case is set to a fixed value. The value is chosen such that, when viewed on its own, it leads to an activation factor AF of 1, i.e., permits maximum dynamic driver intervention.

The second item of steering control information L2 provided by the second controller unit 6 is transferred to an addition point 9. There, the second item of steering control information L2 and the first item of steering control information L1 are added and, as a result, a modified item of steering control information L3 is provided.

The third item of steering control information L3 is, in turn, supplied to a safety barrier SB which provides a fourth item of steering control information L4 on the output side. The safety barrier SB is a unit which monitors or actively limits the manipulated variable before it is physically taken into account in terms of absolute height and gradient.

The safety barrier SB is configured, for example, to monitor the modified item of steering control information L3 in terms of its compliance with safety objectives and, if necessary, to modify it if the safety objectives are not being complied with. For example, the absolute height of the modified item of steering control information L3 and the gradient thereof can thus be monitored and, if necessary, also actively limited.

The fourth item of steering control information L4 forms the input variable of the electromechanical steering system 2. Depending on the driver torque information M and the first and the second item of adjustment information A1, A2, the second controller unit 6 generates a second item of steering control information L2 which changes the first item of steering control information L1 generated by the driver assistance system 3, so that a dynamic influence of the driver, which is dependent on the first and the second item of adjustment information A1, A2, is possible on the steering system 2 of the vehicle.

The mode of operation of the control unit 4 is such that the control unit 4 receives, for example, a nominal value of an item of torque information DI of an angle controller of the electromechanical steering system 2 and, as a function of the level of the torque difference ΔM and the second item of adjustment information A2, the torque difference ΔM is reduced with the aid of the second controller unit 6. To this end, the second controller unit 6 generates a second item of steering control information L2 (steering angle bias signal) which is added to the first item of steering control information which is provided by the trajectory tracking control 3.3. As a result, a control loop is formed which increasingly reduces the torque difference ΔM.

As indicated by the arrow running upward from the steering system 2 to the unit 7, information from the electromechanical steering system 2 can also be used to capture the driving state or the driving situation.

As described above, the unit 7 is designed to recognize and evaluate the driving situation or the driving state. The unit 7 can also observe the driver, for example by way of a camera, and derive the driver's behavior therefrom. In particular, the unit can provide information as to whether the driver is steering in the same direction as the specification of the driver assistance system or whether the driver is steering against the specification of the driver assistance system.

The unit 7 can, for example, react as follows to driving situations or driving states or to the driver behavior:

If the driver steers into a danger area, the counter-torque of the driver assistance system 3 should be clearly noticeable and act in the direction of the safe section of lane. The first item of adjustment information A1 (driver torque threshold value) and the second item of adjustment information A2 (oversteering stiffness) assume high values in terms of their amounts;

If the driver steers in the direction of the safe section of lane, the driver should not be impeded in this maneuver. The first item of adjustment information A1 (driver torque threshold value) and the second item of adjustment information A2 (oversteering stiffness) assume low values in terms of their amounts.

If the driver signals a wish to cooperate to the driver assistance system 3, for example by way of a manual torque, this should be possible with little steering torque effort, i.e., with low intensity. Examples of this would be the selection of an alternative driving route past an obstacle on the right instead of on the left, or the driver's wish for a constant lateral offset instead of exact lane center guidance, which he communicates to the driver assistance system 3 via appropriate steering. In these cases, the first item of adjustment information A1 (driver torque threshold value) and the second item of adjustment information A2 (oversteering stiffness) assume low values in terms of their amounts.

If the driver assistance system 3 reaches the limits of the electromechanical steering system when cornering and the driver would like to support lateral guidance in order to prevent the vehicle from leaving the bend, this should not manifest itself as counter-steering to the driver with the consequence of a high counter-torque on the steering wheel, but rather as assisted steering. In the case of the assisted steering, the driver only has to apply the component of steering force which remains after deducting the maximum steering force of the electromechanical steering system which is due to the limitation. The first item of adjustment information A1 (driver torque threshold value) and the second item of adjustment information A2 (oversteering stiffness) assume high values in terms of their amounts, so that the control unit 4 leaves the first item of steering control information L1 unchanged and this is forwarded to the electromechanical steering system 2 unchanged or virtually unchanged (i.e., the second item of steering control information is zero or very small) via the safety barrier SB.

If the driver executes an emergency avoidance steering maneuver (e.g., characterized by a high steering angle speed) which is not already triggered by the emergency steering assistance function (or because this is not part of the assistance functionality), the steering torque directed against the driver by the steering angle controller of the electromechanical steering should be very small so as not to hinder the driver during his avoidance maneuver. In this case, the first item of adjustment information A1 (driver torque threshold value) and the second item of adjustment information A2 (oversteering stiffness) assume low values in terms of their amounts.

If the driver executes an emergency avoidance steering maneuver (e.g., characterized by a high steering angle speed) which is not already triggered by the emergency steering assistance function (or because this is not part of the assistance functionality), the driver can additionally obtain active steering assistance in that the controller unit 5 does not execute any limiting or only executes a limiting at high values of the output signal.

When the emergency steering assistance function is activated (i.e., when an emergency avoidance steering maneuver is performed by the driver assistance system), the amounts of the first item of adjustment information A1 (driver torque threshold value) and of the second item of adjustment information A2 (oversteering stiffness) are set to high values as long as the driver steers less strongly than a manner corresponding to the specification of the optimal avoidance trajectory. The optimal avoidance trajectory is characterized by the fact that the vehicle can drive past the obstacle at a safe distance, without putting too much strain on the frictional adhesion potentials on the wheels and causing vehicle instability.

When the emergency steering assistance function is activated, the amounts of the first item of adjustment information A1 (driver torque threshold value) and of the second item of adjustment information A2 (oversteering stiffness) are set to high values, if the driver steers more dynamically than a manner corresponding to the specification of an established limit avoidance trajectory. The limit avoidance trajectory is defined by the fact that the vehicle on the trajectory will be far away from the obstacle but, at the same time, there is a high probability that it can lose frictional adhesion and become unstable.

When the emergency steering assistance function is activated, the amounts of the first item of adjustment information A1 (driver torque threshold value) and of the second item of adjustment information A2 (oversteering stiffness) are set to low values, if the driver uses a steering maneuver to select a trajectory which lies between the optimal and the limit avoidance trajectory. In this case, the optimal avoidance trajectory and the limit avoidance trajectory are continuously re-established and the driver's action is re-evaluated in each case.

In places where the road narrows, particularly in roadworks, there tends to be a greater probability of the trajectory driven having to be corrected by a driver intervention due to the sometimes-poorer quality of the road markings located there. In order to guarantee the correction by the driver with little steering effort, the amounts of the first item of adjustment information A1 (driver torque threshold value) and of the second item of adjustment information A2 (oversteering stiffness) are set to low values when the lane width is narrow or when roadworks are recognized.

In general, when the quality of the road markings is lower, there is an increased probability of the trajectory driven having to be corrected by a driver intervention. Here as well, in order to guarantee the correction by the driver with as little steering effort as possible, the amounts of the first item of adjustment information A1 (driver torque threshold value) and of the second item of adjustment information A2 (oversteering stiffness) are in turn set to low values.

If there is a risk of the vehicle leaving the road due to inattention on the part of the driver, the assistance system first intervenes and starts to move the vehicle into the safe section of the road, but then the driver takes over full control, the steering torque felt should at no time be directed counter to the driver's steering wish, provided that the trajectory chosen by the driver will not lead to a predicted instability of the vehicle. On this condition, the amounts of the first item of adjustment information A1 (driver torque threshold value) and of the second item of adjustment information A2 (oversteering stiffness) are set to low values.

If the driver has selected a sporty d riving mode (if this option is provided in the vehicle equipment), the steering should provide more feedback. In line with this, the recommending torque should also be higher when the driver counter-steers. The amounts of the first item of adjustment information A1 (driver torque threshold value) and of the second item of adjustment information A2 (oversteering stiffness) are set to high values.

The first item of adjustment information A1 (driver torque threshold value) is structured as a function of internal control error variables of the lateral control and indeed, for example, as follows:

the higher the first item of adjustment information A1, the greater the lateral distance of the vehicle from the nominal trajectory;

the higher the first item of adjustment information A1, the greater the difference between the actual steering wheel angle and the nominal steering wheel angle;

the higher the first item of adjustment information A1, the greater the difference between the actual yaw rate and the nominal yaw rate.

The second item of adjustment information A2 (oversteering stiffness) is also structured as a function of internal control error variables of the lateral control and indeed, for example, as follows:

the higher the second item of adjustment information A2, the greater the lateral distance of the vehicle from the nominal trajectory;

the higher the second item of adjustment information A2, the greater the difference between the actual steering wheel angle and the nominal steering wheel angle;

the higher the second item of adjustment information A2, the greater the difference between the actual yaw rate and the nominal yaw rate.

Furthermore, the first and second items of adjustment information A1, A2 are chosen to be smaller if the driver steers against the specification of the driver assistance system and selects an alternative route which does not result in less driving safety.

Conversely, the first and second items of adjustment information A1, A2 are chosen to be larger if the driver has the same vehicle guidance objective as the driver assistance system or if the driver's alternative route leads to or will lead to less driving safety. The driving safety can be evaluated by an expert system on the basis of the predicted collision probabilities and the predicted loss of frictional adhesion potential at the wheels.

Like the unit 7, the control unit 4 can be provided, for example, on a control unit of the driver assistance system 3. As an alternative to this, the control unit 4 can also be embodied on the control device of the electromechanical steering system 2. To this end, the interface between the control unit of the driver assistance system 3 and the control unit of the electromechanical steering system 2 is, for example, extended for the transfer of the first and second items of adjustment information A1, A2.

In addition, the system 1 can advantageously have one or more of the following functionalities:

If switching between discrete values for the first and second items of adjustment information A1, A2 should be provided, the values are to be smoothed/interpolated, if necessary, prior to conversion by the control unit 4 in order to avoid an unwanted jerk in the steering wheel. The first and second items of adjustment information A1, A2 have a continuous character and are determined, for example, by fuzzy logic operations.

If conflicting requirements of the rules of influence exist at the level of the driver torque, e.g., an activation of the emergency avoidance assistant with a high value for the first item of adjustment information A1 within an area of road-works, in which in principle a low first item of adjustment information A1 should be chosen, these can be resolved, for example, by an arbitrator unit in the driving status recognition.

The driver torque can also be influenced, for example, by the control unit 4 replanning the nominal trajectory in a suitable manner as a function of the driver's steering activity, instead of the restriction control described above. The planning of a trajectory which leads, e.g., exactly along the lane chosen by the driver, results in a counter-torque of 0 Nm for the driver, neglecting the initial states of the controller. Planning a trajectory to the right or left of the trajectory currently being driven leads to a steering recommendation to the right or left.

The disadvantage of this procedure is that in the course of replanning, the initial states of the controller (e.g., the I-component in the steering angle controller) have to deliberately be reduced, that is to say that measures are not just left at the planning level. Furthermore, the effort to achieve seamless transitions and, therefore, a constant steering torque curve is higher with this approach.

A new trajectory due to driver steering, which leads to less driver steering torque, also implicitly becomes part of a control loop, so that additional precautions on the part of trajectory planning are necessary to ensure stability, including in particular with regard to the generally larger latency between triggered replanning and the impact on the driver torque. In the case of emergency steering maneuvers in which the driver must not be hindered, the trajectory would have to be replanned in each scanning step (e.g., every 10 ms), starting from the vehicle movement currently imparted by the driver. This is associated with a high computational effort and yet cannot eliminate angle controller components having a damping character. If, instead, the first or second item of adjustment information A1, A2 with the value "0" is chosen, an inhibiting contribution of zero can be achieved by the angle control at the torque interface with the electromechanical steering system 2. In the case of a steering angle interface with the electromechanical steering system 2, the inhibition by the angle controller can be greatly reduced in practice with adjustment factors A1, A2 from zero to low residual torques. A coordinated overall behavior can then only be achieved from the interaction of the driver torque restriction and a new trajectory planning.

The second item of adjustment information A2 (oversteering stiffness) can also be implicitly influenced in that the first item of adjustment information A1 (driver torque threshold value) is controlled as a function of the steering wheel deflection. However, the outlay to also ensure stability is also higher here.

The method described can also be applied if, instead of a steering angle specification for the steering system 2, a yaw rate or curvature is specified. Instead of a steering angle bias, the control unit 4 then generates correction variables for the nominal yaw rate or nominal curvature.

In the case of a driver assistance system 2 based on an angle interface with the electromechanical steering system 2, the actual steering wheel angle can additionally be used within the first control unit 4 in order to structure the restriction of the driver torque in a more dynamic manner during oversteering. To this end, in an intermediate step, the nominal steering angle is mixed proportionally with the actual steering angle when a driver torque is above the first item of adjustment information A1 until the nominal steering angle ultimately corresponds to the actual steering angle as the driver torque information M continues to rise. As a result, the control difference of the steering angle controller of the electromechanical steering system 2 becomes zero and the torque requirement for the actuator of the steering system 2 cannot initially continue to rise. However, in order to discharge the controller integral components in the steering angle controller of the electromechanical steering system 2, negative feedback of the torque requirement with the aid of the second controller unit is still required.

In the case of a driver assistance system 2 based on an angle interface with the electromechanical steering system 2, the nominal torque information of the steering angle controller minus a defined component can be taken into account within the control unit 4 instead of feeding back the entire nominal torque information of the steering angle controller in the fixed value control. The component is then to be defined on the basis of the first and second items of adjustment information A1, A2. If an item of second adjustment information (oversteering stiffness) is high or if an item of driver torque information M is still low, this component is chosen to be high. If the driver torque information M increases or if a low second item of adjustment information A2 (oversteering stiffness) is required, this component is chosen to be small with the end value of 0. This procedure can be required in the case of steering angle controller implementations on the steering system 2 having high dynamics as, otherwise, the steering angle nominal torque working against the driver will be reduced completely too early and the second item of adjustment information A2 (oversteering stiffness) is perceived as being too low. Alternatively, the subtraction of a component of the steering angle nominal torque can also be converted into a corresponding nominal value of the second controller unit.

The present disclosure has been described above with reference to example embodiments. It is understood that numerous alterations as well as variations are possible, without departing from the scope of protection defined by the claims.

List of reference numerals

1 System
2 Steering system
3 Driver assistance system
   3.1 Environment recognition unit
   3.2 Trajectory planner unit
   3.3 Trajectory tracking control
   3.4 Steering angle controller
4 Control unit
   4.1 Summing unit
   4.2 Subtraction point
5 First controller unit
6 Second controller unit
7 Unit
8 Addition point 9 Addition point
A1 First item of adjustment information
A2 Second item of adjustment information
AF Activation factor
DI Torque information
L1 First item of steering control information
L2 Second item of steering control information
L3 Third/modified item of steering control information
L4 Fourth item of steering control information
M Driver torque information
DM Torque difference
S1 First interface
S2 Second interface
SB Safety barrier
$\varphi_{nom}$ Nominal steering angle information

The invention claimed is:

1. A system for actuating an electromechanical steering system of a vehicle, comprising;
a driver assistance system, which includes at least one controller and is configured to generate a first item of steering control information, and
a control unit with at least one first controller unit, wherein the control unit has a first interface, which is configured to receive driver torque information at an input of the first interface, and at least one second interface, which is configured to receive at a first input at least one item of adjustment information which is dependent on at least one of a driving state and/or a driving situation, the at least one item of adjustment information comprising a first item of adjustment information and a second item of adjustment information,
wherein the first item of adjustment information is a driver torque threshold value and the second item of adjustment information comprises oversteering stiffness information, the oversteering stiffness information being a measure of steering resistance that a driver of the vehicle has to overcome on a steering device of the vehicle in order to oversteer a steering behavior specified by the driver assistance system,
wherein the control unit adjusts the driver torque information according to the first item of adjustment information to determine an item of torque difference information,
wherein the control unit uses the torque difference information and the second item of adjustment information to determine a second item of steering control information, and
wherein the system is configured to provide a modified item of steering control information to the steering system of the vehicle based on the first item and the second item of steering control information, a steering movement being executed on the electromechanical steering system based on the modified item of steering control information.

2. The system according to claim 1, wherein the first item of steering control information is an item of angle information, an item of torque information for an actuator of the electromechanical steering system or an item of information proportional to a torque of the actuator of the electromechanical steering system.

3. The system according to claim 1, wherein the control unit is configured, when an amount of the driver torque information is above the driver torque threshold value, to generate the second item of steering control information which brings about a modification of the first item of steering control information provided by the driver assistance system.

4. The system according to claim 1, wherein the control unit is configured to adjust a control behavior of the first controller unit of the control unit based on the second item of adjustment information.

5. The system according to claim 1, wherein one of the first item of adjustment information and the second item of adjustment information has a fixed value and the other one of the first item of adjustment information and the second item of adjustment information has a value which is dependent on the driving state or the driving situation, or the first item of adjustment information and the second items of adjustment information are both dependent on the driving state or the driving situation.

6. The system according to claim 3, wherein the control unit is configured such that the first controller unit receives the torque difference information which is zero when an amount of the driver torque information is less than or equal to the driver torque threshold value, and has an amount of driver torque information reduced by the driver torque threshold value as soon as the amount of the driver torque information exceeds the driver torque threshold value.

7. The system according to claim 1, wherein the first controller unit has a monotonically decreasing amount characteristic above a limit frequency.

8. The system according to claim 7, wherein the first controller unit has control behavior in accordance with a PT1 controller.

9. The system according to claim 6, wherein the first controller unit has control behavior such that, as a result of the modification of the first item of steering control information by the second item of steering control information, the torque difference supplied to the first controller unit as an input variable is reduced.

10. The system according to claim 1, wherein in the event that the first item of steering control information is an item of angle information, an item of yaw rate information or an item of curvature information, a second controller unit is configured to convert an item of nominal torque information of a steering angle controller for an actuator of the electromechanical steering system or an item of information proportional to the nominal torque information into an item of steering angle information, an item of yaw rate information or an item of curvature information as the second item of steering control information.

11. The system according to claim 10, wherein the second controller unit is configured to receive an item of nominal torque information of the steering angle controller, which is weighted with an activation factor, for the actuator of the electromechanical steering system, wherein the activation factor is provided by the first controller unit.

12. The system according to claim 10, wherein the second controller unit is configured to receive the second item of adjustment information, and the control behavior of the second controller unit is adjusted based on the second item of adjustment information.

13. The system according to claim 10, wherein the second controller unit has at least one of a monotonically decreasing amount characteristic above a limit frequency and/or has control behavior in accordance with a PT1 controller.

14. A method for actuating an electromechanical steering system of a vehicle, comprising:
providing a driver assistance system, which provides a first item of steering control information, and
providing a control unit with at least one first controller unit,
receiving, at the control unit, driver torque information at a first input of the control unit which a human driver of a vehicle applies to a steering device of the vehicle, and receiving at one or more second inputs of the control unit at least one item of adjustment information which is dependent on at least one of a driving state or a driving situation, the at least one item of adjustment information comprising a first item of adjustment information and a second item of adjustment information, wherein the first item of adjustment information is a driver torque threshold value and the second item of adjustment information comprises oversteering stiffness information, the oversteering stiffness information being a measure of steering resistance that a driver of the vehicle has to overcome on a steering device of the vehicle in order to oversteer a steering behavior specified by the driver assistance system, by the control unit, adjusting the driver torque information according to the first item of adjustment information to determine an item of torque difference information, by the control unit, using the torque difference information and the second item of adjustment information to determine a second item of steering control information, and providing a modified item of steering control information to the electromechanical steering system of the vehicle based on the first and the second items of steering control information, a steering movement being executed on the electromechanical steering system based on the modified item of steering control information.

\*   \*   \*   \*   \*